(12) United States Patent
Shu

(10) Patent No.: US 6,765,748 B2
(45) Date of Patent: Jul. 20, 2004

(54) METHOD OF INTERLEAVING SERVO INFORMATION FIELDS FOR TRACK FOLLOWING AND SEEKING AND A RECORDING MEDIUM INCLUDING INTERLEAVED SERVO INFORMATION FIELDS

(75) Inventor: Andrew B. Shu, Cupertino, CA (US)

(73) Assignee: Samsung Electronics Co., Ltd., Suwon (KR)

(*) Notice: Subject to any disclaimer, the term of this patent is extended or adjusted under 35 U.S.C. 154(b) by 232 days.

(21) Appl. No.: 10/013,672

(22) Filed: Dec. 13, 2001

(65) Prior Publication Data

US 2003/0112539 A1 Jun. 19, 2003

(51) Int. Cl.⁷ .......................... G11B 5/596; G11B 5/09
(52) U.S. Cl. .................... 360/77.04; 360/77.08; 360/53; 360/77.05; 360/78.14
(58) Field of Search ..................... 360/48, 77.04, 360/77.08, 75, 77.02, 53, 77.01, 77.06, 77.05, 77.07, 78.14, 78.04

(56) References Cited

U.S. PATENT DOCUMENTS

| 5,526,202 A | * | 6/1996 | Blagaila et al. | 360/77.08 |
| 5,825,578 A | * | 10/1998 | Shrinkle et al. | 360/77.08 |
| 6,049,440 A | * | 4/2000 | Shu | 360/77.04 |
| 6,493,173 B1 | * | 12/2002 | Kim et al. | 360/77.04 |

* cited by examiner

Primary Examiner—David Hudspeth
Assistant Examiner—Natasha Figueroa
(74) Attorney, Agent, or Firm—Volentine Francos, PLLC; Jeffrey P. Aiello

(57) ABSTRACT

A method of interleaving servo information fields on a recording medium, and a corresponding recording medium having interleaved servo information fields, that reduce the amount of disk surface area needed for servo information, to thus increase disk surface area available for data storage. The track layout includes regular sector servo fields and reduced sector servo fields interleaved with data fields. The regular sector servo fields include servo correction information such as repetitive run-out (RRO) cancellation values. The servo correction information of the reduced sector servo field does not include servo correction information. The servo correction information of the reduced sector servo field is merged into the regular sector servo field.

26 Claims, 14 Drawing Sheets

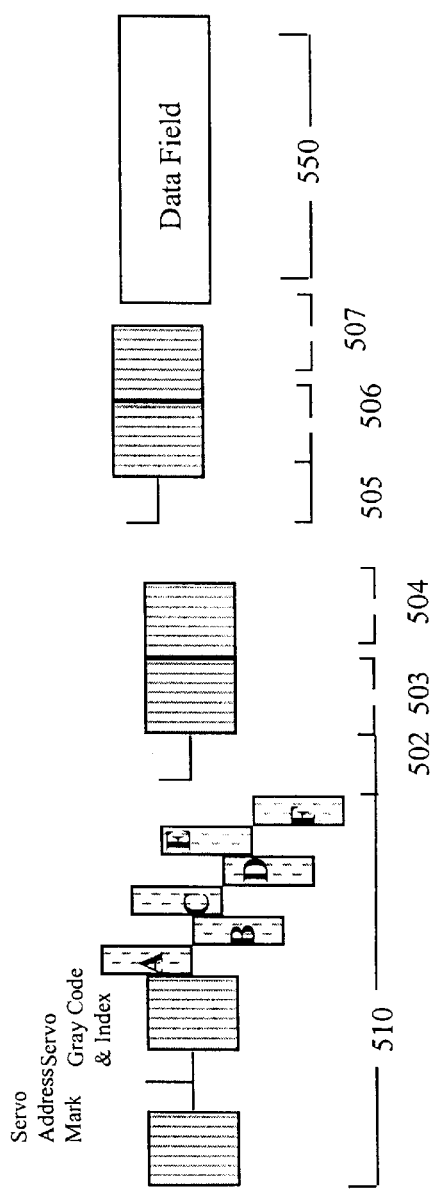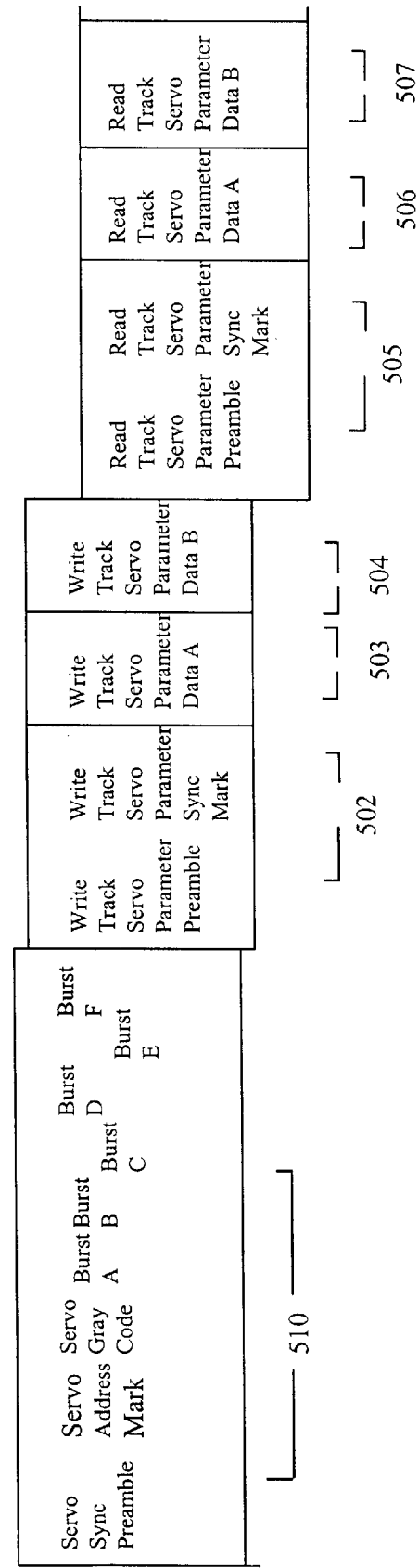
Figure 10A
Figure 10B

METHOD OF INTERLEAVING SERVO INFORMATION FIELDS FOR TRACK FOLLOWING AND SEEKING AND A RECORDING MEDIUM INCLUDING INTERLEAVED SERVO INFORMATION FIELDS

BACKGROUND OF THE INVENTION

1. Field of the Invention

The present invention relates to a method of embedding interleaved servo information fields onto a disk used as a storage medium for a disk drive, and a disk having interleaved servo information fields embedded thereon for use as a storage medium for a disk drive.

2. Description of the Related Art

Disks used as storage mediums for conventional disk drive assemblies typically have embedded sector servo position information inserted thereon for closed loop GMR (giant magnetoresistive) head or MR (magnetoresistive) head position control. The embedded sector servo position information fields include information that generally provides timing reference, track identification, and fine track burst information. The head position system controls the position of the head carrier within the disk drive assembly, so that the read and write heads stay on the desired data track of the disk to read and write data accurately. The sector servo position information fields are exclusively used by the head position system, and cannot be used for storage of general data. The area of the disk surface allotted for embedded sector servo position information is thus overhead with respect to disk storage area. As disk capacity and TPI (track per inch) of current disk technology increase, the total number of sector servo position information fields on the track necessary to meet performance and shock vibration requirements also increases.

FIG. 1 illustrates a typical disk drive assembly 100 including spindle 104, disk platter surface 102, actuator arm 114, head carrier 110, servo positioning motor 116, counter balance arm 118, servo controller 120 and servo control circuit board 122. The disk platter surface 102 may be coated with a ferro-magnetic material suitable for storing magnetic information. The mechanical layout of actuator arm 114 including a read and write head, as related to disk platter 102 and the disk drive chassis, is described in U.S. Pat. No. 6,049,440, which is hereby incorporated by reference in its entirety for all purposes.

FIG. 2A illustrates conventional embedded sector servo position fields 200 inserted between data fields 250 of a track on a disk of a conventional disk drive assembly. The conventional sector servo position information fields 200 generally include a servo preamble, a servo address mark, a servo gray code and index, and servo bursts A, B, C and D, as illustrated in greater detail in FIG. 2B. However, as disk capacity and TPI for disks of the conventional head drive assemblies have increased, compensation for spindle repetitive run-out (RRO) has become necessary.

As additional background, a servo preamble is a field typically used by a servo circuit in the data channel ASIC chip for servo circuit AGC (automatic gain control) and servo bit signal phase synchronization. During this field, the servo circuits establish proper signal amplitude and correct phase alignment for the servo address mark and following servo gray code and index field decoding. The servo address mark is a unique pattern field occurring after the servo preamble. The pattern is typically selected as a pattern having the least possibility of detection as actual data over the entirety of the track including the data field. Once the pattern is detected, a correct location on the track such as a mark on the disk can be used as a reference. This pattern field establishes the basic timing reference for the servo gray code and index field, as well as the reference timing for the burst field. The servo gray code and index field contains the servo track address, and may also include the servo sector address number and head number. Gray code encoding is typically used so that only one address bit changes from one track address to the next track address. The index typically is the first servo sector address number to indicate the beginning of a track. A servo sector address number (corresponding to the sequences of the servo sector field) may reach a few hundred. The servo burst field includes several burst fields for generating a position signal. A 4-burst scheme is widely used. A 6-burst scheme may be used to provide better linearity for the position signal, with an additional 2-burst overhead however.

FIG. 3A illustrates a conventional track layout for a disk of a hard drive assembly, the track layout including embedded sector servo fields 300 inserted between data fields 350. In this conventional track layout, a respective RRO field 303 is included for each sector servo field 300. RRO field 303 is servo correction information that is used to compensate RRO during track following. In the track layout as illustrated in FIG. 3A, each RRO field 303 is used to compensate RRO during both reading and writing of the data fields, under the condition that offset between the MR head write element and read element on the head carrier is minimal. Additionally, a track servo parameter preamble and a track servo parameter sync mark, indicated as field 302, is appended to each RRO field 303, to enable the RRO field to be read.

In general, RRO fields 303 typically contain an RRO value and a few information control bits such as a defect bit, or other information bits to indicate the condition of the data field or the servo field itself (like bad, poor or good, for example). The RRO value is the compensation value for track following. Fields 302 and 303 are written onto the disk during manufacturing of the disk drive assembly. After several rounds of reading a position signal derived from a 4-burst or a 6-burst field, the analysis of these position signals provides information about spindle motor run-out. The badly written burst fields and/or defects can also be identified. The RRO value is the cancellation value that compensates the spindle motor repetitive run-out to allow the head to stay on the track, to prevent the MR head from wandering away from the desired track.

FIG. 3B illustrates a conventional track layout including embedded sector servo fields 300 inserted between data fields 350, that is similar to the conventional track layout of FIG. 3A. However, separate write and read RRO fields 308 and 309 are respectively provided for each sector servo position field 300. Each of the write RRO fields 308 include a corresponding write track servo parameter preamble and write track servo sync mark field 302, and each of the read RRO fields 309 include a corresponding read track servo parameter preamble and read track servo sync mark field 302. By using separate write RRO fields and read RRO fields, better track registration and performance may be achieved in a case wherein large offset is present between the MR head write element and read element on the head carrier.

The above described embedded sector servo fields including the servo correction information are inserted on the disk surface in pie-shaped sectors by the disk drive assembly manufacturer, as illustrated in FIG. 4. The various tracks 1000, 1001 and 1002 are divided into sectors 1003, 1004 and 1005 for example, wherein embedded sector servo information fields 1006 including the servo correction information as described above are inserted on every track at a corresponding sector boundary. Conventionally, the sector servo information fields are each the same size and are equally spaced on the disk surface. The embedded sector servo area overhead of the disk surface is the ratio of the area used for head position servo fields to the area used for data storage. As may be particularly understood in view of FIG. 4, embedded sector servo area overhead of a typical disk is high. Thus, the disk surface area that may be used for data storage is limited, and this becomes especially noticeable as disk capacity and TPI rate of current disk technology increase.

SUMMARY OF THE INVENTION

The present invention is therefore directed to a method of interleaving servo information fields onto a track of a recording medium, and a recording medium having at least one track with data fields and servo fields interleaved thereon, which substantially overcome one or more of the problems due to the limitations and disadvantages of the related art.

An object of the invention is to thus reduce embedded sector servo area overhead on the disk surface, so that data storage area on the disk may be increased.

The above and other objects may be achieved by a method of interleaving servo information fields onto a track of a recording medium, including inserting data fields onto the track; inserting a first servo field onto the track, the first servo field including servo correction information that is used for accessing the data fields; and inserting a second servo field onto the track, the second servo field being a reduced servo field that is used for accessing the data fields and that does not include servo correction information. The servo correction information of the first servo field includes first servo correction information for the first servo field and second servo correction information for the second servo field. The servo correction information may be repetitive run-out (RRO) cancellation values that are used for accessing the data fields and information status bits used to indicate the condition of the servo and data fields.

The above and other objects may also be achieved by a recording medium having at least one track with data fields and servo fields interleaved thereon, the recording medium including a first servo field inserted onto the at least one track, the first servo field including servo correction information that is used for accessing the data fields; and a second servo field inserted onto the at least one track, the second servo field being a reduced servo field that is used for accessing the data fields and that does not including servo correction information. The servo correction information of the first servo field includes first servo correction information for the first servo field and second servo correction information for the second servo field. The servo correction information may include repetitive run-out (RRO) cancellation values that are used for accessing the data fields and information status bits used to indicate the condition of the servo and data fields.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10A and 10B illustrate a regular sector servo field A of FIG. 5, of a further embodiment of the present invention;

DETAILED DESCRIPTION OF THE PREFERRED EMBODIMENTS

As bit density and track density for higher capacity disk drive assemblies increase, the total number of sector servo fields typically must increase to meet drive shock and vibration operation requirements, which may be dependent on environment. In general, if disk surface area used for sector servo position information fields can be reduced, disk surface area for data storage may be increased.

Figure 5:
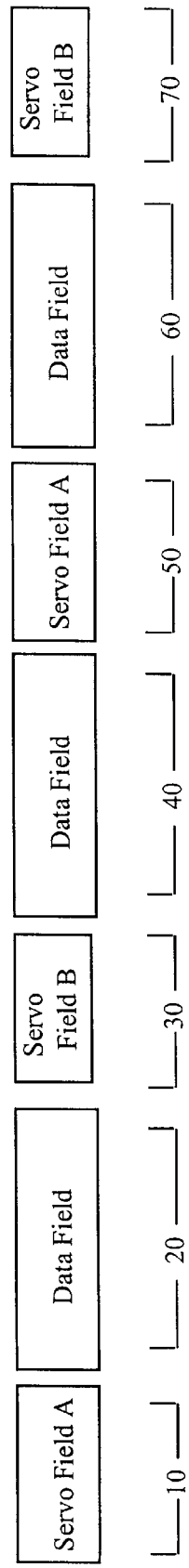
FIG. 5 illustrates a track layout of an interleaved sector servo field arrangement in accordance with an embodiment of the present invention.

FIG. 5 illustrates a track layout of an interleaved sector servo field arrangement in accordance with an embodiment of the present invention. Reduced sector servo burst fields B are interleaved between the data fields in place of corresponding regular sector servo bursts fields A. Specifically, the track layout includes in order regular sector servo burst field A 10 followed by data field 20, reduced sector servo burst field B 30, data field 40, regular sector servo burst field A 50, data field 60, reduced sector servo burst field B 70, . . . etc. Reduced sector servo burst fields B 30 and 70 are inserted in place of regular sector servo burst field A. As will be described and understood in greater detail as follows, the reduced sector servo burst fields B are smaller than regular sector servo burst fields A, and decrease the overall disk surface area allotted to the servo fields. Since the embedded sector servo area overhead is reduced, disk area for data storage is increased.

Figure 6A:
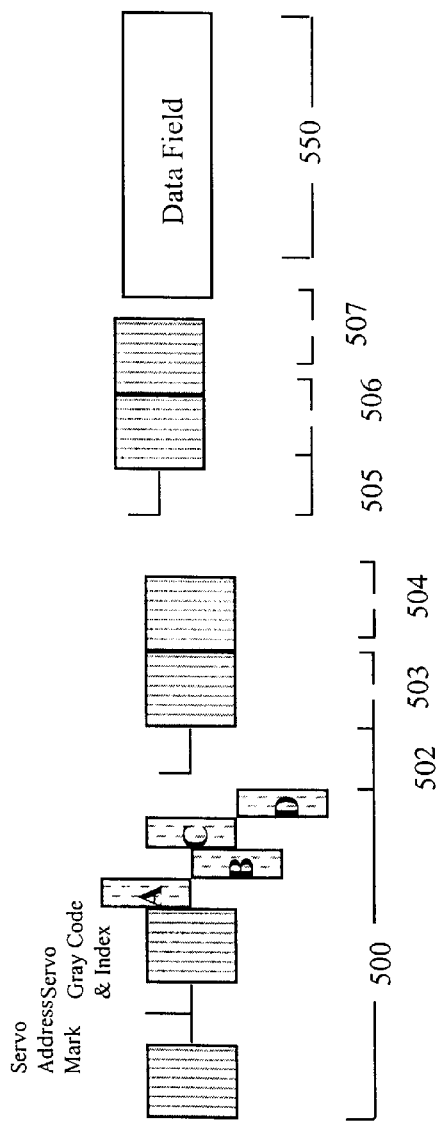
FIGS. 6A and 6B illustrate a regular sector servo field A of FIG. 5, of an embodiment of the invention.
Figure 6B:
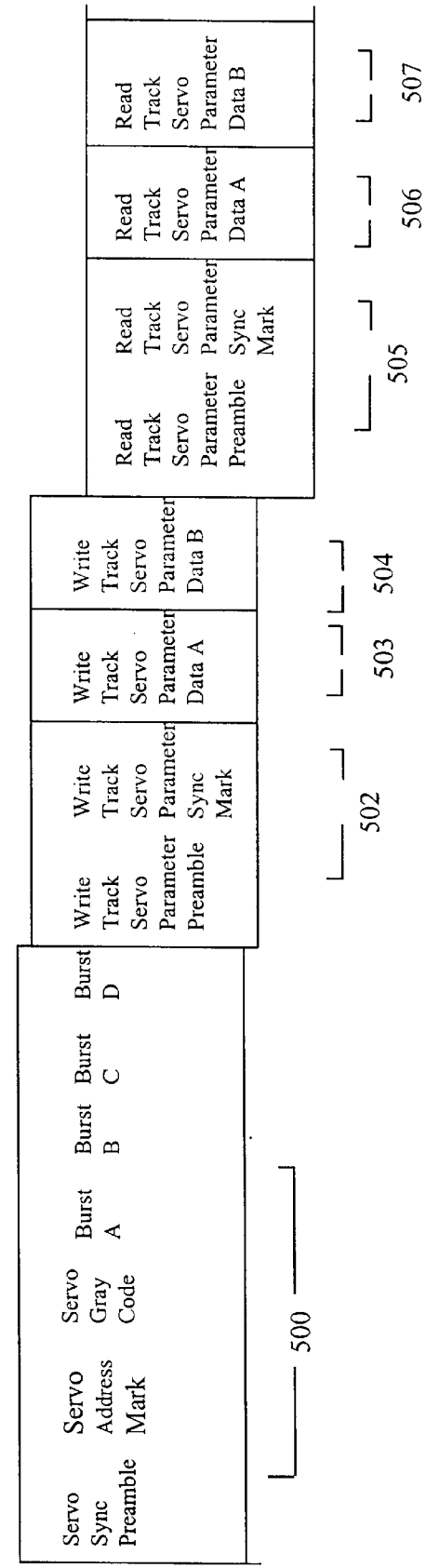

FIG. 6A illustrates in detail regular sector servo field A of FIG. 5, and FIG. 6B identifies the components of regular sector servo field A, of an embodiment of the invention. Embedded sector servo position field 500 includes a servo sync preamble, a servo address mark, a servo gray code and servo bursts A, B, C and D. The embedded sector servo position field 500 is followed by RRO fields which are servo correction information. In particular, field 502 is inserted after embedded sector servo position field 500, and includes a write track servo parameter preamble and a write track servo parameter sync mark that enables reading of the subsequent RRO field. RRO field 503 is inserted after field 502, and includes write track servo parameter data A that is servo correction information for the servo sector position information of the current field 500, or in other words for the current regular sector servo field A. RRO field 504 is inserted after RRO field 503, and includes write track servo parameter data B that is servo correction information for the servo sector position information of the following or next field 500 of the track, or of field B (a reduced sector servo field B). In other words, write track servo parameter data B corresponds in part to servo correction information that is not present in a following or next reduced sector servo field B of the track layout.

It is to be hereinafter understood that an RRO field is not necessarily limited as including only servo correction information, but may also include information status bits. Information status bits may be used to indicate the condition of the original sector servo field (such as bad, poor or good, for example), as well as a defect like condition of the data field.

In the above particular example described with respect to FIG. 6A, regular sector servo field A includes separate write and read RRO fields. Field 505 thus includes a read track servo parameter preamble and a read track servo parameter sync mark, and is inserted after field 504. Also, field 506 includes read track servo parameter data A and field 507 includes read track servo parameter data B, as sequentially inserted after field 505. Similarly as explained above, read track servo parameter data A is servo correction information for the current regular sector servo field A, and read track servo parameter data B servo is correction information for the next reduced sector servo field B. Accordingly, regular sector servo field A as illustrated in FIGS. 6A and 6B includes conventional embedded sector servo position field 500; a modified write servo parameter field including fields 502, 503, and 504; and a modified read servo parameter field including fields 505, 506 and 507.

Regular sector servo field A as illustrated in FIGS. 6A and 6B includes separate write and read RRO fields. This track layout thus is used to achieve better track registration and performance in the case wherein a large offset is present between the MR head write element and read element of the head carrier.

Figure 7A:
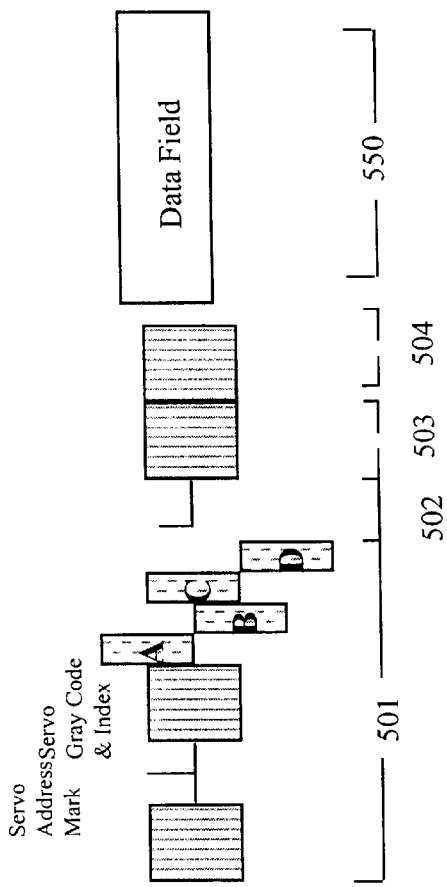
FIGS. 7A and 7B illustrate a regular sector servo field A of FIG. 5, of another embodiment of the invention.
Figure 7B:
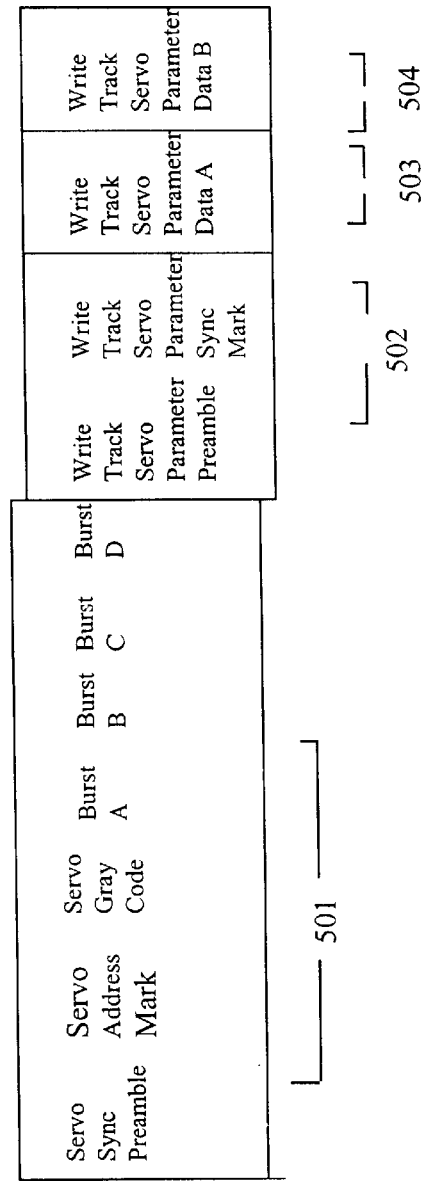

FIGS. 7A and 7B illustrate a regular sector servo field A similar to that as illustrated in FIGS. 6A and 6B, including only a modified write servo parameter field inserted therein. Particularly, field 502 is inserted after embedded sector servo position field 501, and includes a write track servo parameter preamble and write track servo parameter sync mark. Field 503 includes write track servo parameter data A and field 504 includes write track servo parameter data B, as sequentially inserted after field 502. The above noted modified write servo parameter field in FIGS. 7A and 7B as including fields 502, 503 and 504, compensates for RRO during both writing and reading of the data fields. This regular sector servo field A is used in the case wherein offset between the MR head write element and read element of the head carrier is minimal, or in the case wherein compensation for the MR head read element during reading of data from the read data track is not required.

Figure 8A:
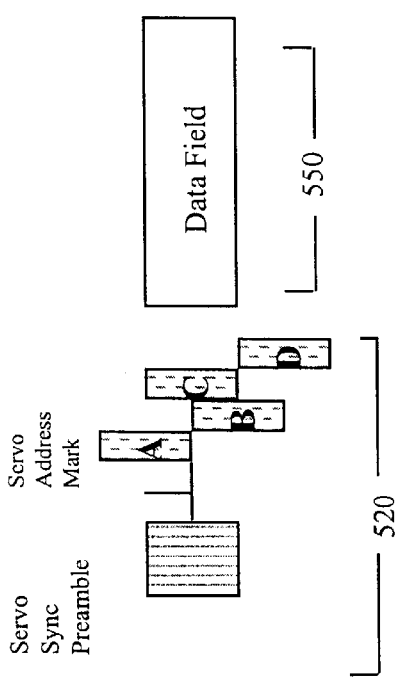
FIGS. 8A and 8b illustrate a reduced sector servo field B of FIG. 5, of an embodiment of the invention.
Figure 8B:
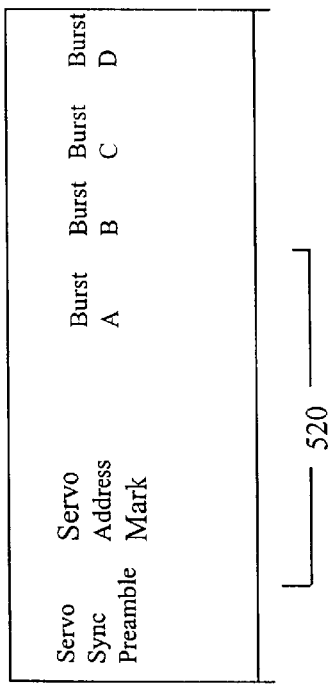

FIG. 8A illustrates in detail reduced sector servo field B of FIG. 5, and FIG. 8B identifies the components of the reduced sector servo field B, of an embodiment of the invention. Embedded sector servo position field 520 is similar to that as illustrated in FIGS. 7A and 7B for example, and includes a servo sync preamble, a servo address mark and four servo bursts A, B, C and D. However, a servo gray code is not included in embedded sector servo position field 520. Also, the data field is inserted directly following embedded sector servo position field 520. Servo correction information such as RRO cancellation values and information status bits are not included in reduced sector servo field B. That is, the servo correction information for this reduced sector servo field B is merged into regular sector servo field A illustrated in FIGS. 7A and 7B, as part of the write track servo parameter data field B 504 as previously described. Accordingly, reduced sector servo field B is smaller than regular sector servo field A, thus reducing the disk surface area allotted to servo information. This will be made clear in detail later with reference to FIGS. 15A and 15B.

As noted above, the servo gray code is not included in the servo position field 520 in FIG. 8A. The servo gray code area typically provides a track address, a sector address or a head address (the sector address or head address may or may not be included). When the reduced sector servo field B is not used during seeking, and only used during final settling and track following, the gray code information for sector servo field B can be assumed to be the same as that in regular sector servo field A. The sector address number can be a single count added to the sector number of the regular sector servo field A, if the sector address field from the regular sector servo field A is used. For example, the sector number address in regular sector servo gray code field A can be 1, 3, 5 . . . etc., and the reduced sector field B sector address can then be just one count higher, for example 2, 4, 6 . . . etc.

The judgement here is whether the sampling rate provided by the regular sector servo field A only is good enough for seek performance or not. If performance is good enough for seeking while using only the regular sector servo field A, there is no need to add overhead for the gray code address in reduced sector servo field B. However, if sector servo field B is used for a short seek, the gray code track address for sector servo field B needs to be included to cover enough track addresses, while the sector number and head number can be eliminated to reduce overhead using the same assumption that it can be calculated or obtained from regular sector servo field A. During final settling and track following, higher sampling rate is desired to provide good track following performance.

The sector servo field B gray code includes track addresses because the head may move more than half or one track within the time between which the head reads the regular sector servo field A and the reduced sector servo field B. Both sector servo field A and sector servo field B can be utilized during short seek, final settling and track following. During long seek, the sector servo field B does not necessarily need to be used. That is, the speed during long seek is fast and high enough to move several tracks (for example 7 tracks) during the time between which the head reads the regular sector servo field A and the reduced sector servo field B. In order for sector servo field B to be used during long seek, the sector servo field B gray code needs to include a minimum 4-bit track address to cover 16 tracks, for example. The performance effect is during the long seek, wherein the sampling rate is reduced to half if sector servo field B is not used. When both sector servo field A and sector servo field B are used, the sampling rate is doubled. During long seek, half of the sampling rate as compared to final settling and track following may provide enough performance for long seek. This means that the sector servo field B can be eliminated during long seek if performance is adequate enough.

Another tradeoff to be considered is the small overhead required for the least significant bits track address to be included in the reduced sector servo field B, to allow both sector servo field A and sector servo field B to be used for long seek. For example, 7-bits of track address information may be good enough to cover the maximum head seeking velocity during a long seek between adjacent sector servo field A and sector servo field B. The most significant bits of the track address bits can be assumed to be the same for the regular sector servo field A and reduced sector servo field B.

Figure 9A:
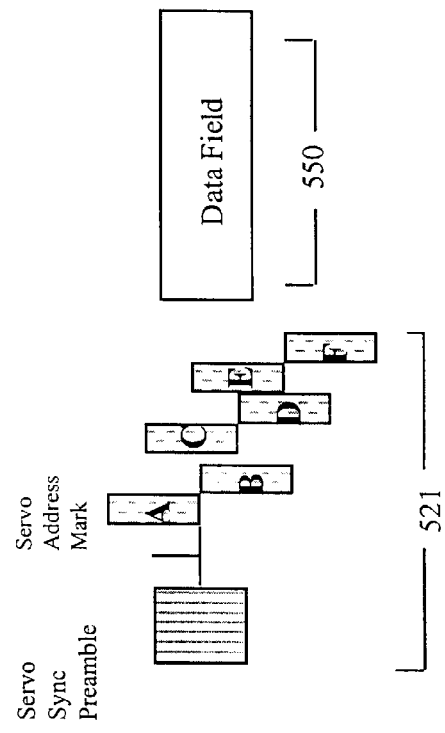
FIGS. 9A and 9B illustrate a reduced sector servo field B of FIG. 5, of another embodiment of the invention.
Figure 9B:
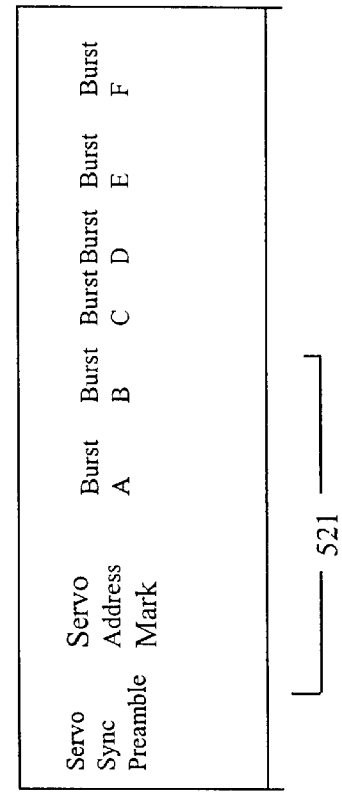

FIG. 9A illustrates in detail reduced sector servo field B of FIG. 5, and FIG. 9B identifies the components of the reduced sector servo field B, of an embodiment of the invention. Embedded sector servo position field 521 in FIGS. 9A and 9B is similar to that as illustrated in FIGS. 8A and 8B, except for including six servo bursts A, B, C, D, E and F instead of four servo bursts as in FIGS. 8A and 8B. This six burst option takes up more disk space and therefor results in a larger embedded sector servo position field than in FIGS. 8A and 8B, but however provides better servo position error signal linearity.

FIG. 10A illustrates in detail regular sector servo field A of FIG. 5, and FIG. 10B illustrates the components of regular sector servo field A, of an embodiment of the invention. Regular sector servo field A illustrated in FIGS. 10A and 10B is substantially the same as regular sector servo field A illustrated in FIGS. 6A and 6B. However, embedded sector servo position field 510 in FIGS. 10A and 10B includes six servo bursts A, B, C, D, E and F, instead of four servo bursts as in embedded sector servo position field 500 of FIGS. 6A and 6B. Although the six burst option requires additional disk surface area, servo position error signal linearity is improved. Incidentally, the six bursts option can also be used when a single RRO field only is provided for both writing and reading, in the case where offset between the MR head write element and read element of the head carrier is minimal. The modified read servo parameter field including fields 505, 506 and 507 in FIG. 10B would be eliminated in this instance.

Figure 11A:
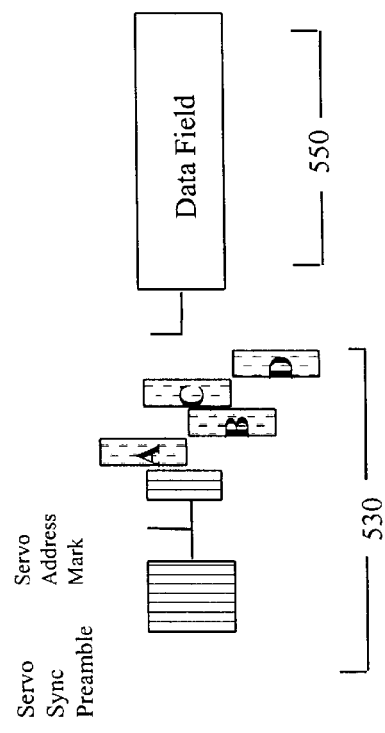
FIGS. 11A and 11B illustrate a reduced sector servo field B of FIG. 5, according to a further embodiment of the present invention.
Figure 11B:
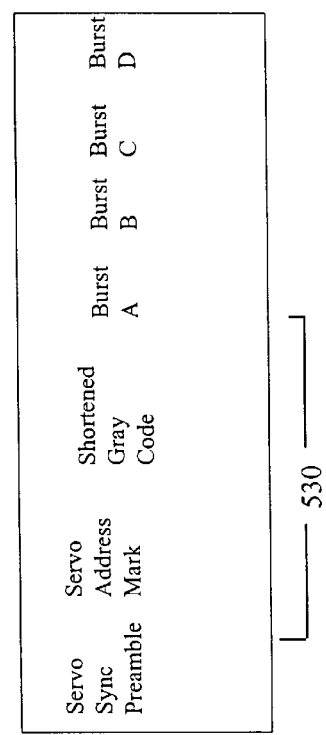

FIG. 11A illustrates in detail reduced sector servo field B of FIG. 5, and FIG. 11B illustrates components of reduced sector servo field B, of an embodiment of the invention. Reduced sector servo field B illustrated in FIGS. 11A and 11B is substantially the same as reduced sector servo field B illustrated in FIGS. 8A and 8B. However, embedded sector servo position field 530 in FIGS. 11A and 11B include a shortened gray code, in contrast to embedded sector servo position field 520 of FIGS. 8A and 8B which includes no gray code. This shortened gray code may include a few least significant track address bits, for example two bits, which enables the head element to move a distance greater than one track in the radial direction. Reduced sector servo field B in FIGS. 11A and 11B may thus be used like regular sector servo field A during short seek and final seek settling. Also, this shortened gray code may include enough least significant track address bits to cover maximum velocity during long seek, to allow reduced sector servo field B to be utilized during seeking. The most significant track address bits for the shortened gray code area can be obtained and shared from the regular sector servo field A gray code track address.

Figure 12A:
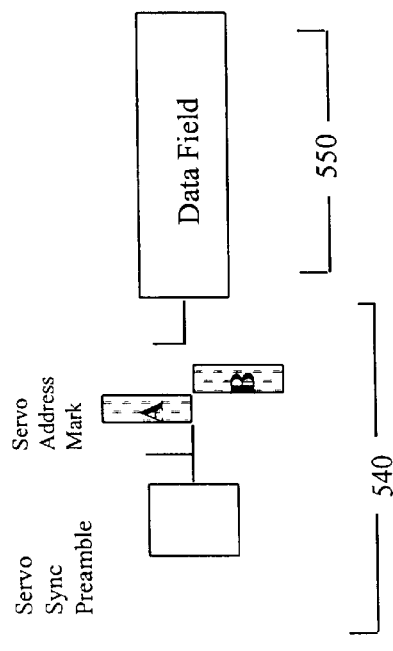
FIGS. 12A and 12B illustrate a reduced sector servo field B of FIG. 5, according to a further embodiment of the present invention.
Figure 12B:
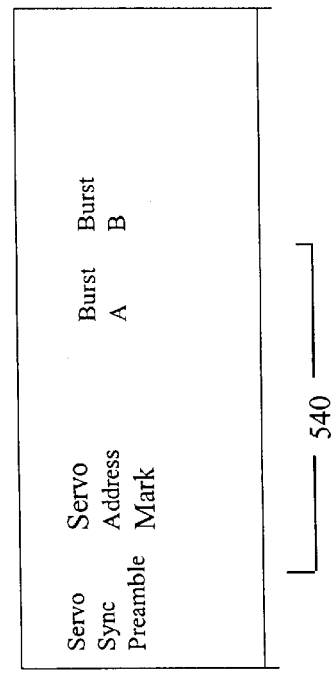

FIG. 12A illustrates in detail reduced sector servo field B of FIG. 5, and FIG. 12B illustrates components of reduced sector servo field B, of an embodiment of the present invention. Reduced sector servo field B illustrated in FIGS. 12A and 12B is substantially the same as reduced sector servo field B illustrated in FIGS. 8A and 8B. However, embedded sector servo position field 540 of FIGS. 12A and 12B include only two servo bursts A and B, instead of four servo bursts as in embedded sector servo position field 520 of FIGS. 8A and 8B. This two burst option requires minimum embedded sector servo area overhead for reduced sector servo field B. Incidentally, in this embodiment data tracking during a read operation can be achieved using regular sector servo field A, without relying on reduced sector servo field B. This is because in an environment where shock and vibration are high, a read error is recoverable upon a re-try. However, data tracking during a write operation cannot be reliably achieved only with regular sector servo field A. A write track error can cause severe damage to data integrity and must be avoided, and thus reduced sector servo field B must also be used during write tracking. By also using reduced sector servo field B in this embodiment, detection and prevention of write tracking error is achieved, and tighter position error signal information during writing with increased sampling data for write tracking can be realized.

Figure 13:
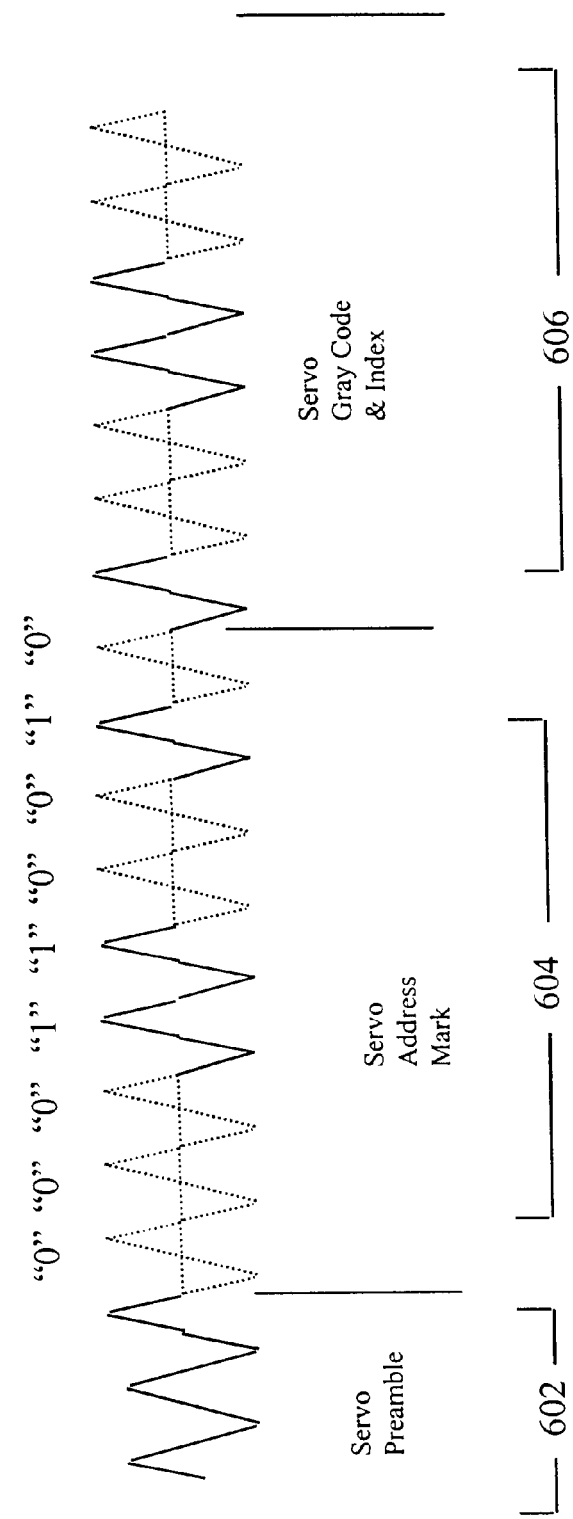
FIG. 13 illustrates a servo address mark for a regular sector servo field A of an embodiment of the invention.

FIG. 13 illustrates a servo address mark 604 for regular sector servo field A of an embodiment of the invention, along with servo preamble 602 and servo gray code and index 606. Servo address sync mark 604 in FIG. 13 is a 9-bit pattern. Of course different patterns and pattern length may be used, the patterns being different to signify different meaning. The 9-bit pattern "000110010" of servo address sync mark 604 may for example be used as a typical servo ID address sync mark. A different 9-bit pattern "000101101" may for example be used as a servo address sync mark and index mark. The pattern is normally selected based on head/media characteristics and encoding/decoding schemes used in data channel chips of servo detection related circuits. A pattern that has the least likelihood of duplicating magnetic flux transitions on the disk in a data field is selected, in order to avoid misdetection. The pattern as selected also should provide the most fault tolerant bit errors. A typical hardware circuit implementation uses a programmable register to hold the selective pattern for comparison. The matching of a pattern read from the disk with the pattern of the servo address sync mark, generates reference timing for servo information in the servo field. The matching criteria may be set so as to allow one bit or two bit errors. Incidentally, the total number of bits of the servo address sync mark is a tradeoff between fault tolerant reliability and overhead of disk area. The pattern will provide improved fault tolerant characteristics if more bits are used. However, an increased number of bits results in reduction of disk area for storage data.

Figure 14:
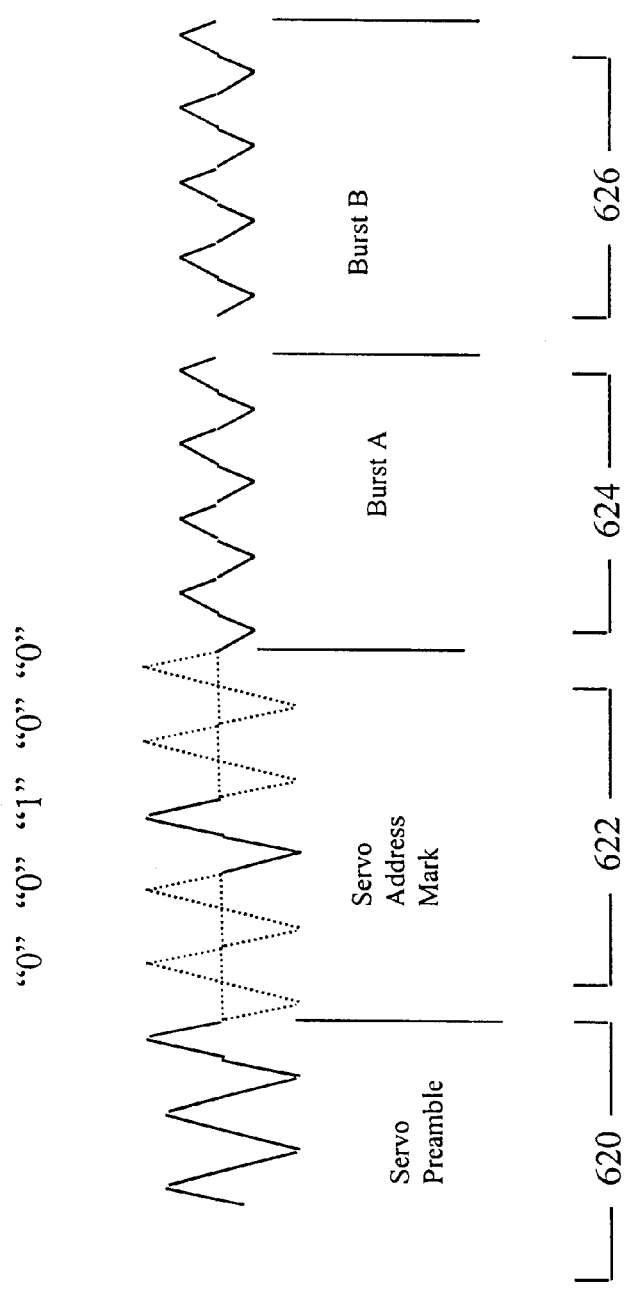
FIG. 14 illustrates a servo address mark for a reduced sector servo field B of an embodiment of the invention.

FIG. 14 illustrates a servo address mark 622 for a reduced sector servo field B of an embodiment of the invention, along with servo preamble 620 and bursts 624 and 626. A shortened servo address mark is a tradeoff between servo overhead and servo address mark detection fault tolerance. The shortened 5-bit servo address mark pattern 622 in FIG. 14 is "00100". This 5-bit servo address mark pattern 622 has a higher misdetection and false detection probability as compared to the 9-bit servo address mark pattern of regular sector servo field A described above. However, the four bits that are saved by using a 5-bit servo address mark pattern results in additional disk area that can be allotted for storage data. To improve the reliability of the servo address mark of reduced sector servo field B of FIG. 14, reference timing may be prequalified and referenced to regular sector servo field A, in the case of misdetection or false detection caused by using the servo address mark of reduced sector servo field B. A re-try scheme may also be used if error is detected. Incidentally, if better performance is desired so that a re-try scheme is not necessary, the servo address mark in reduced sector servo field B may be modified to be the same as in regular sector servo field A.

Figure 1:
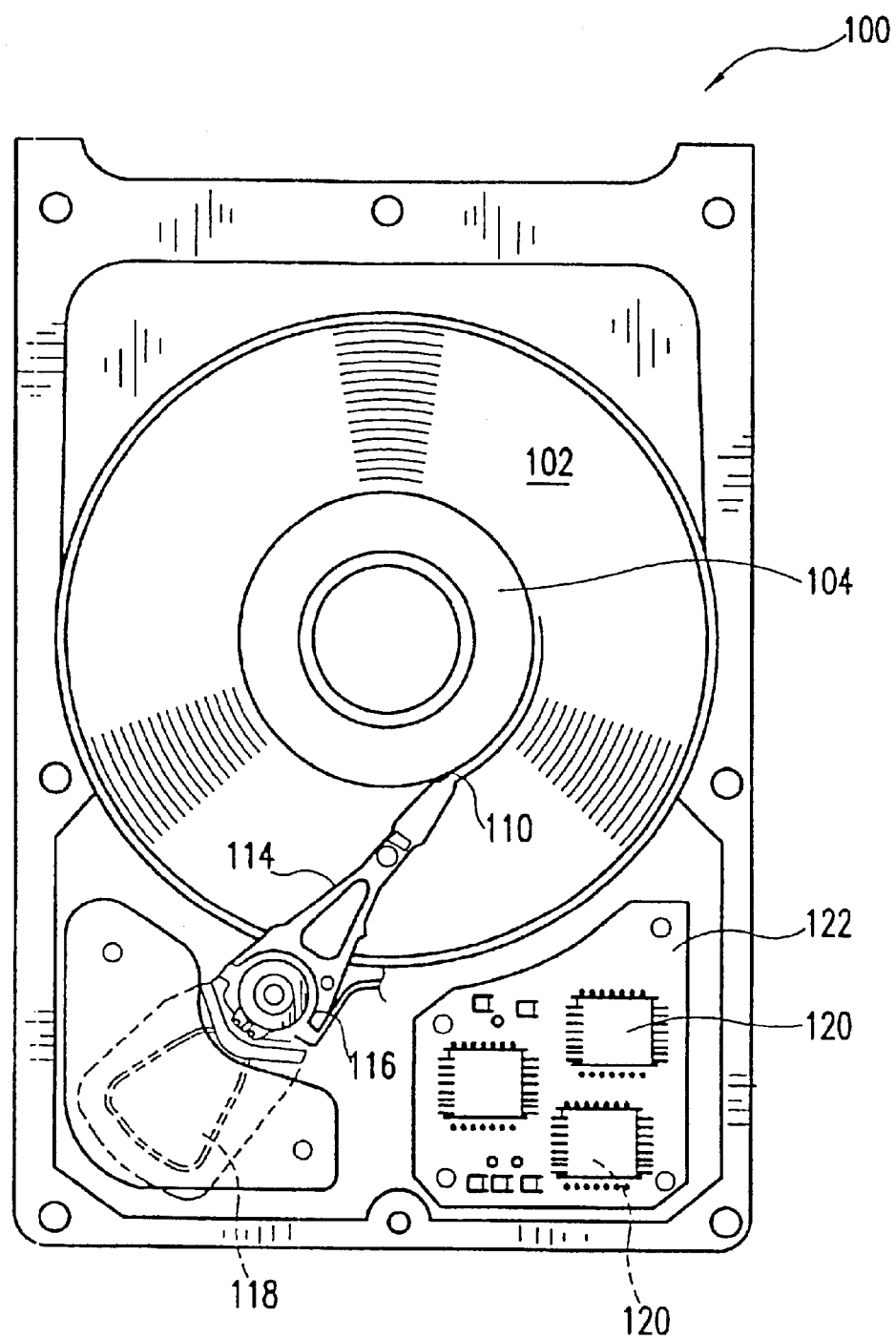
FIG. 1 illustrates a typical disk drive assembly.
Figure 2A:
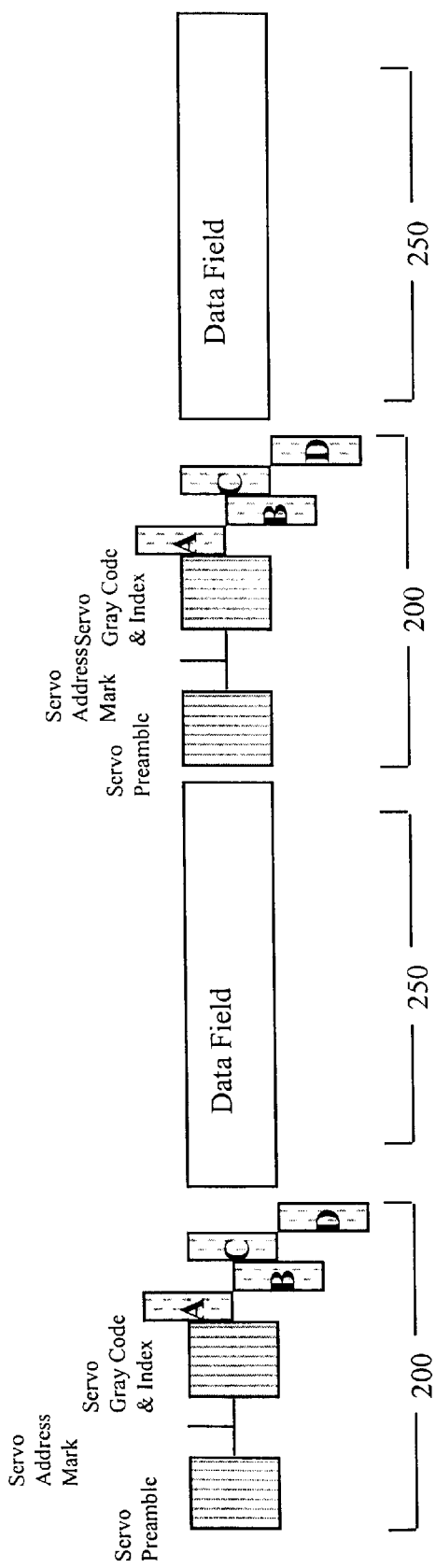
FIGS. 2A and 2B illustrate conventional embedded sector servo position fields.
Figure 2B:
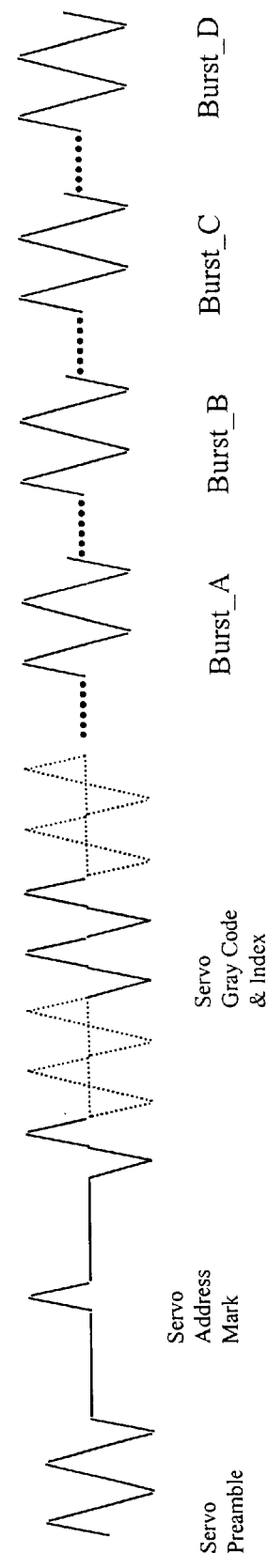
Figure 3A:
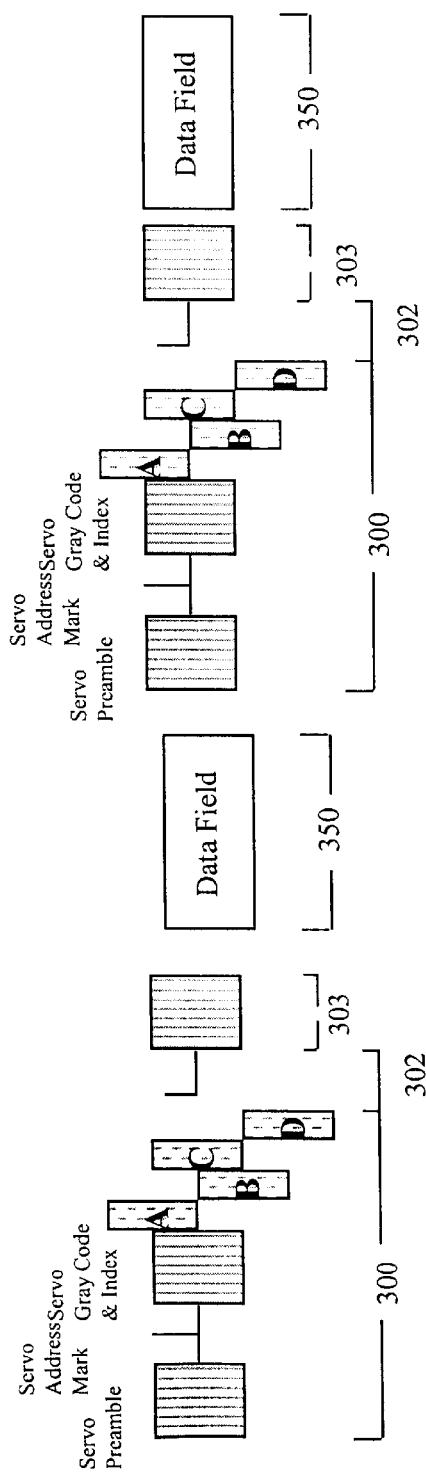
FIGS. 3A and 3B illustrate conventional track layouts including embedded sector servo fields having servo correction information.
Figure 3B:
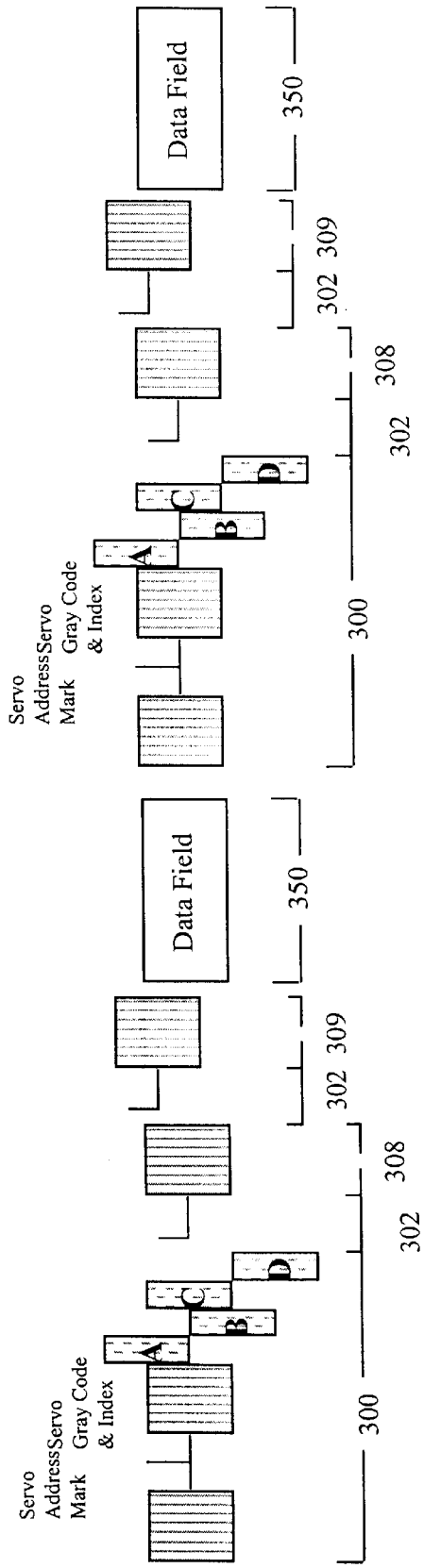
Figure 4:
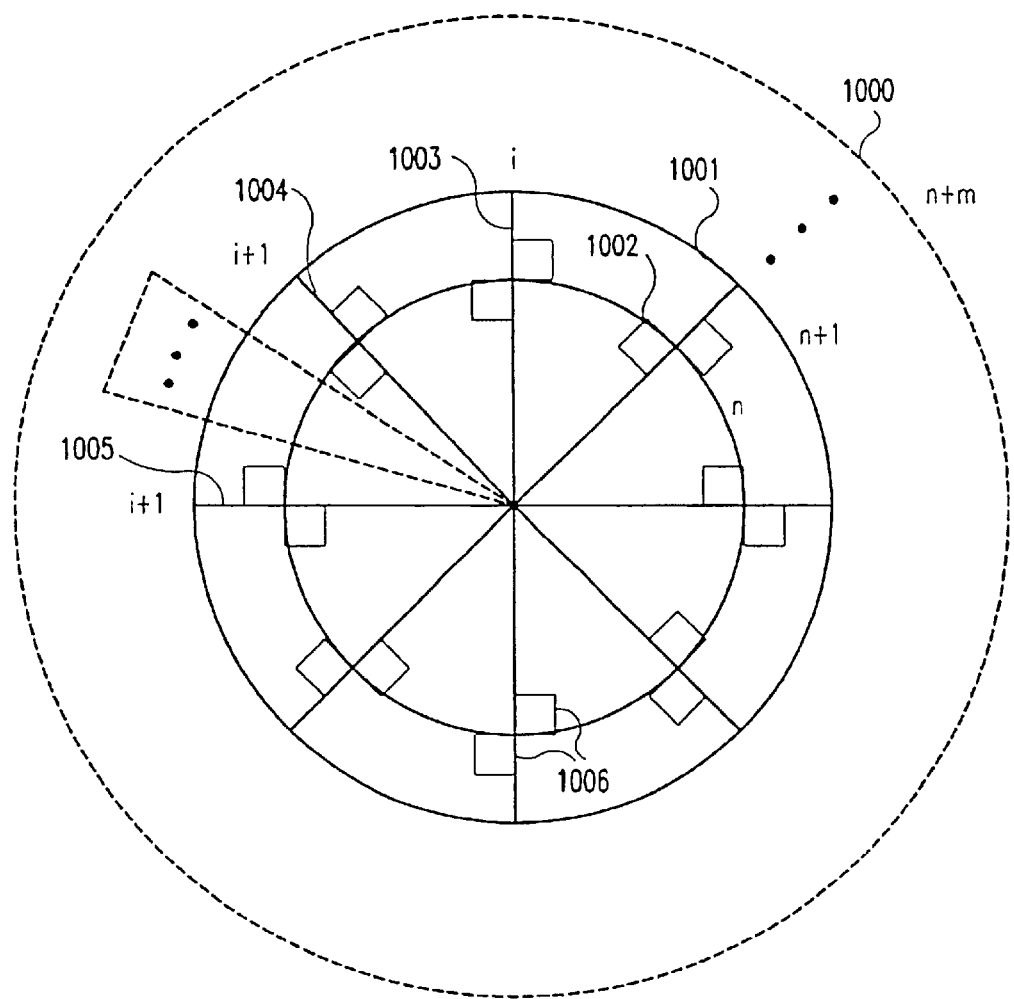
FIG. 4 illustrates conventional track layout as pie-shaped sectors of a disk.
Figure 15A:
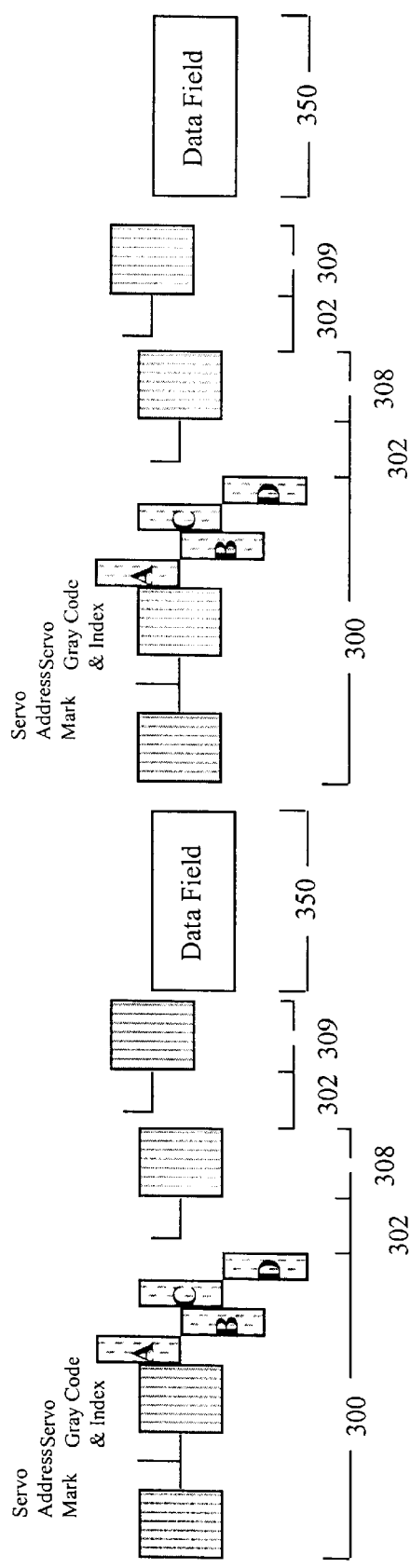
FIGS. 15A and 15B respectively illustrate a conventional track layout and a track layout in accordance with a preferred embodiment of the invention, for purposes of comparison.
Figure 15B:
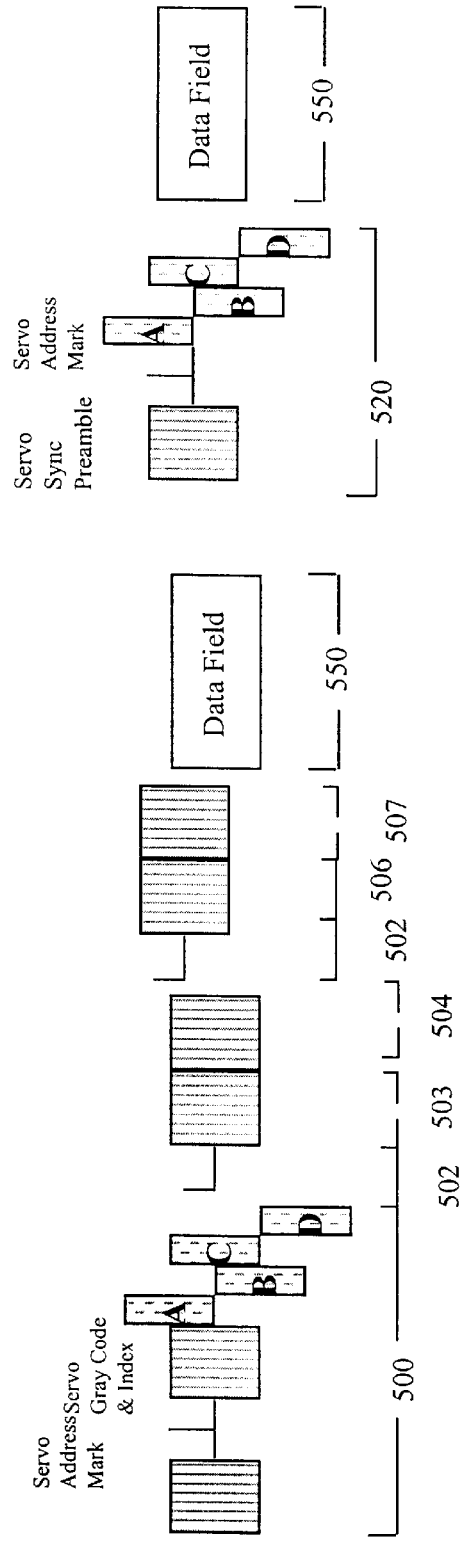

In order to more clearly emphasize the disk area that may be saved in accordance with the interleaved servo fields of the invention, FIGS. 15A and 15B respectively illustrate a conventional track layout and a track layout in accordance with a preferred embodiment of the present application, for purposes of comparison. FIG. 15A illustrates the conventional track layout having embedded sector servo fields 300 inserted between the data fields 350, the embedded sector servo fields each including separate write and read RRO fields 308 and 309, as in FIG. 3B. FIG. 15B illustrates track layout of a preferred embodiment of the present invention, which includes regular sector servo field A as illustrated in FIG. 6A and reduced sector servo field B as illustrated in FIG. 8A, interleaved with data fields 550.

In the track layout of a preferred embodiment illustrated in FIG. 15B, the fields corresponding to sync fields 302 in the second sector servo field of the conventional track layout illustrated in FIG. 15A, are eliminated. In other words, the second servo correction information field of the track layout of the preferred embodiment illustrated in FIG. 15B, which is a reduced sector servo field B, does not have fields 302 (track servo parameter preamble and track servo parameter sync mark) inserted therein. Also, the servo correction information fields 308 and 309 that are part of the second sector servo field in the conventional track layout illustrated in FIG. 15A, are appended or merged to the first or regular sector servo field in FIG. 15B as fields 504 and 507. The sync fields 502 and 505 of the regular sector servo field in FIG. 15B are used to synchronize the bit stream and detect the bit boundaries for reading the servo correction information fields 503 and 506, as well as the appended servo correction information fields 504 and 507. By appending servo correction information fields 504 and 507 to the regular sector servo field in FIG. 15B, the net saving of disk surface area in the reduced sector servo field is equivalent to the area corresponding to both of fields 302 of the second servo field in the conventional track layout illustrated in FIG. 15A. Also, the gray code field is eliminated from the reduced sector servo field B in FIG. 15B, and the simplified or shortened servo address mark field is also used in reduced sector servo field B, to provide further net savings of disk surface area. Thus, the track layout of the FIG. 15B embodiment of the present invention saves substantial disk space, so that additional disk area may be allotted to data storage as compared to the conventional track layout.

As emphasized previously, the RRO fields may also include information status bits in addition to servo correction information. The information status bits thus may or may not be included in the RRO fields. The information status bits can be used to indicate the condition of the original sector servo field as being bad, poor or good, for instance. Also, the information status bits may indicate a defect like condition of the data fields. For instance, the information status bits may indicate that a particular sector servo field is bad due to a defect, or is distorted too much and thus cannot be used. Such a sector field can be discarded and not used. In conventional disk drive systems, a table is developed in memory to store information indicative of defective sector servo fields. However, this conventional approach inefficiently uses memory space (DRAM) to store the servo field defect table. Also, system processing must be dedicated to table search and comparison tasks. By use of the above noted information status bits as in the present invention, such additional system processing may be eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of interleaving servo information fields onto a track of a recording medium, comprising:
   inserting data fields onto the track;
   inserting a first servo field onto the track, the first servo field including servo correction information that is used for accessing the data fields; and
   inserting a second servo field onto the track, the second servo field being a reduced servo field that is used for accessing the data fields and that does not include servo correction information,
   the servo correction information of the first servo field including first servo correction information for the first servo field and second servo correction information for the second servo field.

2. The method of interleaving servo information fields of claim 1, wherein the servo correction information comprises repetitive run-out (RRO) cancellation values that are used for accessing the data fields.

3. The method of interleaving servo information fields of claim 2, wherein the RRO cancellation values include first RRO cancellation values for the first servo field and second RRO cancellation values for the second servo field.

4. The method of interleaving servo information fields of claim 2, wherein the first servo field further comprises a servo parameter preamble and a servo parameter sync mark to enable synchronizing of the first servo field and reading of the RRO cancellation values, and wherein the second servo field does not include a servo parameter preamble and a servo parameter sync mark.

5. The method of interleaving servo information fields of claim 1, wherein the first servo field includes a servo address mark, and the second servo field includes a reduced servo address mark having fewer bits than the servo address mark of the first servo field.

6. The method of interleaving servo information fields of claim 1, wherein the first servo field comprises a single servo field that is used for both read access and write access of the data fields.

7. The method of interleaving servo information fields of claim 1, wherein the first servo field comprises a read servo field that is used for read access of the data fields and a write servo field that is used for write access of the data fields.

8. The method of interleaving servo information fields of claim 1, wherein the first servo field includes a servo burst pattern having four servo bursts that are used for determining position error.

9. The method of interleaving servo information fields of claim 1, wherein the first servo field includes a servo burst pattern having six servo bursts that are used for determining position error.

10. The method of interleaving servo information fields of claim 1, wherein the first servo field includes a servo gray code field, and the second servo field does not include a servo gray code field.

11. The method of interleaving servo information fields of claim 1, wherein the first servo field includes a servo gray code field, and the second servo field includes a reduced servo gray code field that has a shorter bit pattern than the servo gray code field of the first servo field.

12. The method of interleaving servo information fields of claim 1, wherein the recording medium is a disk and the track is a disk track.

13. The method of interleaving servo information fields of claim 1, wherein the first servo field also includes information status bits that indicate condition of the first and second servo fields and the data fields.

14. A recording medium having at least one track with data fields and servo fields interleaved thereon, the recording medium comprising:
- a first servo field inserted onto the at least one track, the first servo field including servo correction information that is used for accessing the data fields; and
- a second servo field inserted onto the at least one track, the second servo field being a reduced servo field that is used for accessing the data fields and that does not include servo correction information,
- the servo correction information of the first servo field including first servo correction information for the first servo field and second servo correction information for the second servo field.

15. The recording medium of claim 14, wherein the servo correction information comprises repetitive run-out (RRO) cancellation values that are used for accessing the data fields.

16. The recording medium of claim 15, wherein the RRO cancellation values include first RRO cancellation values for the first servo field and second RRO cancellation values for the second servo field.

17. The recording medium of claim 15, wherein the first servo field further comprises a servo parameter preamble and a servo parameter sync mark to enable synchronizing of the first servo field and reading of the RRO cancellation values, and wherein the second servo field does not include a servo parameter preamble and a servo parameter sync mark.

18. The recording medium of claim 14, wherein the first servo field includes a servo address mark, and the second servo field includes a reduced servo address mark having fewer bits than the servo address mark of the first servo field.

19. The recording medium of claim 14, wherein the first servo field comprises a single servo field that is used for both read access and write access of the data fields.

20. The recording medium of claim 14, wherein the first servo field comprises a read servo field that is used for read access of the data fields and a write servo field that is used for write access of the data fields.

21. The recording medium of claim 14, wherein the first servo field includes a servo burst pattern having four servo bursts that are used for determining position error.

22. The recording medium of claim 14, wherein the first servo field includes a servo burst pattern having six servo bursts that are used for determining position error.

23. The recording medium of claim 14, wherein the first servo field includes a servo gray code field, and the second servo field does not include a servo gray code field.

24. The recording medium of claim 14, wherein the first servo field includes a servo gray code field, and the second servo field includes a reduced servo gray code field that has a shorter bit pattern than the servo gray code field of the first servo field.

25. The recording medium of claim 14, wherein the recording medium is a disk and the track is a disk track.

26. The recording medium of claim 14, wherein the first servo field also includes information status bits that indicate condition of the first and second servo fields and the data fields.

* * * * *